United States Patent [19]

Tanaka

[11] Patent Number: 4,644,849
[45] Date of Patent: Feb. 24, 1987

[54] LOCKING APPARATUS OF INERTIAL MASS DRIVE HYDRAULIC CIRCUIT SYSTEM

[75] Inventor: Hideaki Tanaka, Ibaraki, Japan

[73] Assignee: Hitachi Construction Machinery Co., Ltd., Tokyo, Japan

[21] Appl. No.: 738,513

[22] Filed: May 28, 1985

Related U.S. Application Data

[63] Continuation of Ser. No. 386,276, Jun. 8, 1982, abandoned.

[30] Foreign Application Priority Data

Jun. 12, 1981 [JP] Japan ................................. 56-89666

[51] Int. Cl.[4] ........................................... F15B 13/042
[52] U.S. Cl. ...................................... 91/445; 60/466; 60/481
[58] Field of Search .................... 91/445; 60/460, 466, 60/481, 489, 493

[56] References Cited

U.S. PATENT DOCUMENTS 2,633,153  3/1953  Gunn ...................................... 91/445
4,356,760  11/1982  Bouteille ............................... 91/445

FOREIGN PATENT DOCUMENTS 1161154  1/1964  Fed. Rep. of Germany ........ 60/460

Primary Examiner—Deborah L. Kyle
Assistant Examiner—Richard L. Klein
Attorney, Agent, or Firm—Antonelli, Terry & Wands

[57] ABSTRACT

An apparatus for locking of an inertial mass drive hydraulic circuit system having a hydraulic pump, an actuator driven by the hydraulic pump for driving a relatively large inertial mass, and a directional control valve mounted in line connecting the hydraulic pump with the actuator. An on-off device is interposed between the actuator and the hydraulic pump for opening or closing the line, and a sensor is provided for sensing the discharge condition of the hydraulic pump. The sensor generates a signal for actuating the on-off device.

4 Claims, 6 Drawing Figures

LOCKING APPARATUS OF INERTIAL MASS DRIVE HYDRAULIC CIRCUIT SYSTEM

This application is a continuation of application Ser. No. 386,276, filed June 8, 1982 now abandoned.

BACKGROUND OF THE INVENTION

This invention relates to hydraulic circuit systems of construction machinery, and, more particularly, to an apparatus for locking an inertial mass drive hydraulic system which controls actuator means for driving a relatively large inertial mass, such as a hydraulic motor for driving a swing of a hydraulic excavator.

A proposed inertial mass drive hydraulic circuit system for construction machinery such as, for example, an excavator, includes a hydraulic pump, actuator means driven by the hydraulic pump for driving a relatively large inertial mass, a directional control valve mounted in line means connecting the hydraulic pump with the actuator means replenishing lines for avoiding production of a negative or subatmospheric pressure in the actuator means, and relief valves for setting a maximum pressure for the main lines between the actuator means and the control valve.

In the proposed hydraulic circuit system, when the directional control valve is switched from one position to another by a control lever to drive an inertial mass, the hydraulic fluid in the hydraulic pump is led to the actuator means such as a hydraulic motor, and the inertial mass is driven by the hydraulic motor. At this time, since force of inertia produced by the inertial mass acts on the hydraulic motor, the speed of the hydraulic motor does not rise quickly, and a high pressure is produced in the main line on the supply side. When the high pressure exceeds the value set by the relief valve, the pressure is released to the main line on the discharge side through the relief valve. Upon completion of acceleration, the hydraulic motor shifts to a steady state condition in which it operates at a constant speed. If the control lever is manipulated to return the control valve to a neutral position, then the main lines are closed by the control valve. At this time, the hydraulic pump continues its operation by the force of inertia of the inertial mass and discharges the fluid drawn from the main line on the supply side to the main line on the discharge side thereby raising the pressure in the discharge side main line. When the high pressure exceeds the value set by the relief valve, the hydraulic fluid in the main line on the discharge side is released to the main line on the supply side through the relief valve. Thus, the hydraulic motor is gradually decelerated by the high pressure in the main line on the discharge side. At this time, as the pressure in the main line on the supply side tends to become subatmospheric, hydraulic fluid is replenished to the main line through the replenishing lines from a reservoir. The aforesaid description also applies to the operation of reversely switching the directional control valve to cause the hydraulic motor to operate in the reverse direction.

One disadvantage of the proposed drive hydraulic circuit system resides in the fact that, when, for example, the hydraulic motor for driving the swing of a hydraulic excavator is driven by the inertial mass drive hydraulic circuit system, the swing would tend to rotate downwardly by its own weight and apply an external force to the hydraulic motor if the hydraulic excavator is stopped on a sloping ground and a prime mover for driving the hydraulic pump is rendered inoperative. If the directional control valve is actuated by mistake in a direction in which the swing is driven in the downward direction, then the main line on the discharge side of the hydraulic motor would be communicated with the reservoir while the main line on the supply side of the hydraulic motor would be communicated with the discharge side of the hydraulic pump through the supply line and with the reservoir through the replenishing lines. Thus, the fluid flowing through the hydraulic motor would flow in circulation and cause the swing to move in swinging movement by the operation of the hydraulic motor. This means that when the hydraulic motor (actuating means) for driving the large inertial mass has the weight of the inertial mass itself or an external force applied thereto, there would be the risk that the hydraulic pump would be actuated if the directional control valve is switched by mistake in a direction in which the hydraulic motor is driven by the weight of the inertial mass or an external force after the hydraulic pump is rendered inoperative by stopping the prime mover.

In the hydraulic circuit system of the aforesaid construction, it is known to provide counter-balance valve means interposed in the main lines between the directional control valve and the actuator means without use of replenishing lines. The counter-balance valve means has a locking function to keep the actuator means from being actuated by its own weight or an external force as the directional control valve is operated by mistake when the hydraulic pump is not in a discharge condition, in addition to the subatmospheric pressure preventing function similar to that performed by the replenishing lines, and the function of keeping the pressure in the supply side main line at a predetermined level. Thus, the hydraulic circuit system provided with the counter-balance valve means is able to avoid the aforesaid risk by its locking function. However, the counter-balance valve means suffers the disadvantages that the valve is complex in construction because of its compound functions described hereinabove and that the valve causes a large loss of energy as by restricting of the fluid because of a built-in check valve. Also, the counter-balance valve means might become operative due to a change in pressure during operation of the hydraulic circuit system irrespective of the wishes of the operator, thereby rendering the operation of the system unstable. Moreover, the system becomes expensive because the construction is complex.

SUMMARY OF THE INVENTION

An object of this invention is to provide an apparatus for locking an inertial mass drive hydraulic circuit system which is capable of keeping the actuator means from being driven when actuator means for driving a large inertial mass has the weight of the inertial mass itself or an external force applied thereto, if the directional control valve is switched by mistake in a direction in which the actuator means is driven by its own weight or an external force after the discharge from the hydraulic pump is interrupted.

Another object is to provide an apparatus for locking an inertial mass drive hydraulic circuit system which has a relatively small loss of energy.

Still another object is to provide an apparatus for locking an inertial mass drive hydraulic circuit system which does not render the operation of the system unstable.

A further object is to provide an apparatus for locking an inertial mass drive hydraulic circuit system which is simple in construction and low in cost.

According to the invention, there is provided an apparatus for locking an inertial mass drive hydraulic circuit system having a hydraulic pump, actuator means driven by the hydraulic pump for driving a relatively large inertial mass, and a directional control valve mounted in line means connecting the hydraulic pump with the actuator means, comprising on-off means interposed between the actuator means and the directional control valve to close or open the line means, and means for sensing the discharge condition of the hydraulic pump thereby to issue a signal for actuating the on-off means.

DESCRIPTION OF THE PREFERRED EMBODIMENTS

Figure 1:
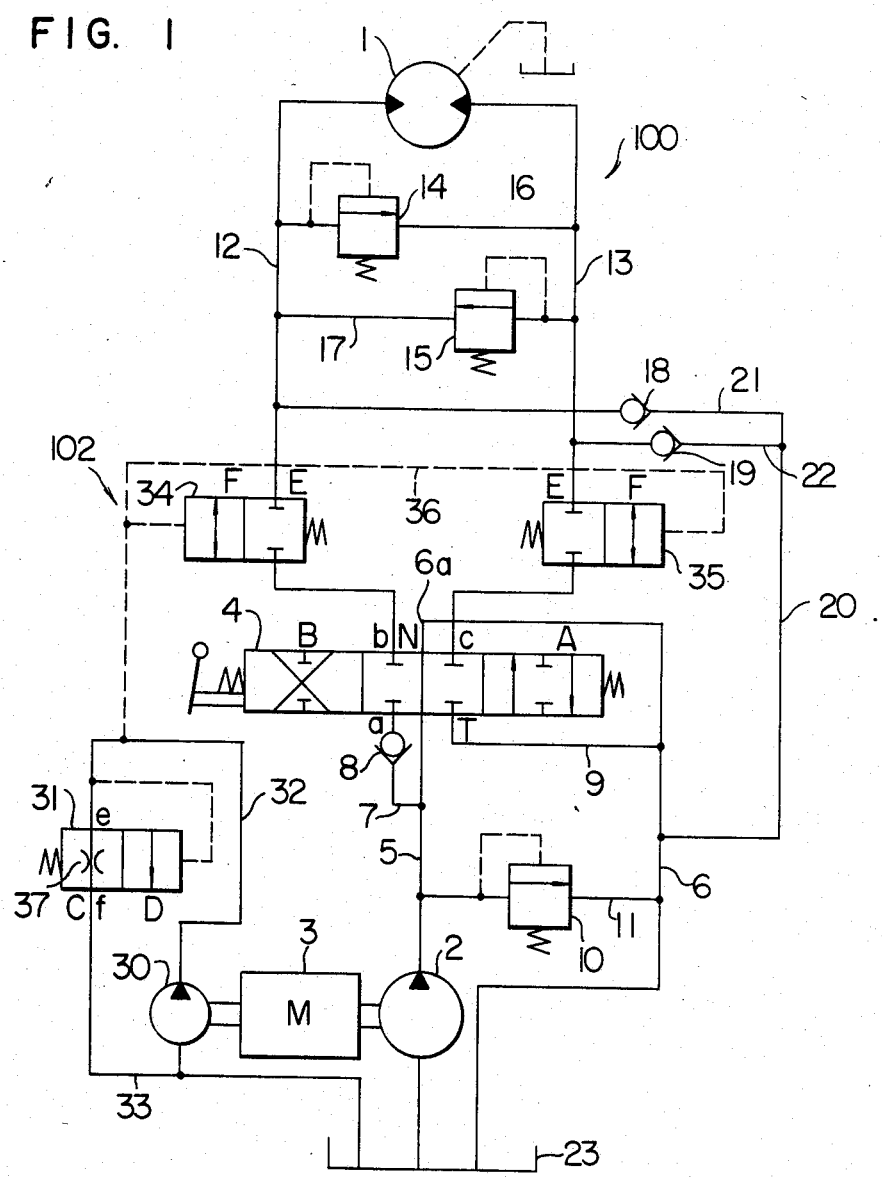
FIG. 1 is a circuit diagram of an inertial mass drive hydraulic circuit system incorporating therein the locking apparatus comprising one embodiment of the invention.

Referring to FIG. 1, the inertial mass drive hydraulic circuit system generally designated by the numeral 100 comprises an actuator or a hydraulic motor 1 for driving an inertial mass or a swing of a hydraulic excavator, for example, a hydraulic pump 2 driven by a prime mover 3, and a three-position directional control valve 4 of the closed center type mounted in line means connecting the hydraulic pump 2 with the hydraulic motor 1. The line means comprises a supply line 5 connected to the hydraulic pump 2 at its discharge side and to a reservoir line 6 through a center bypass line 6a of the control valve 4 open in its neutral position N. Branching from the supply line 5 is an inlet line 7 connected to an inlet port a of the control valve 4 and having mounted therein a check valve 8 for preventing a backflow of hydraulic fluid. The control valve 4 includes a reservoir port T connected to the reservoir line 6 through a line 9. A relief valve 10 is mounted in a line 11 communicating the lines 5 and 6 with each other to set a highest pressure for the line 5.

The line means further comprises a first main line 12 connecting one suction or discharge port of the hydraulic motor 1 and one outlet port b of the control valve 4, and a second main line 13 connecting the other suction or discharge port of the hydraulic motor 1 and the other outlet port c of the control valve 4. A first relief valve 14 is mounted in a line 16 maintaining the lines 12 and 13 in communication with each other to set a highest pressure for the line 12, and a second relief valve 15 is mounted in a line 17 maintaining the lines 12 and 13 in communication with each other to set a highest pressure for the line 13. The lines 12 and 13 are connected with each other through lines 21 and 22 branching from a line 20 connected to the line 6 to have the hydraulic fluid therein replenished, the lines 21 and 22 having check valves 18 and 19 mounted therein, respectively.

The inertial mass drive hydraulic circuit system 100 of the aforesaid construction has incorporated therein a locking apparatus 102 which is a preferred embodiment of the invention. The locking apparatus 102 comprises an auxiliary pump 30 connected to an output shaft of the prime mover 3 for driving the hydraulic pump 2, a pilot pressure setting valve 31 having an inlet port e connected to a line 32 connected to the discharge side of the auxiliary pump 30 and an outlet port f connected to a line 33 connected to a reservoir 23, and pilot operated on-off valves 34 and 35 mounted in the main lines 12 and 13, respectively. The on-off valves 34 and 35 have pilot ports connected to the line 32 through a pilot line 36. The pilot pressure setting valve 31 includes a restrictor 37 built therein and keeps the lines 32 and 33 in communication with each other through the restrictor 37 when in a neutral position N. When the pressure in the line 32 exceeds the set value, the pilot pressure setting valve 31 shifts to a relief position D to keep the pressure in the line 32 constant. The on-off valves 34 and 35 are each provided with a closed position E and an open position F.

Operation of the hydraulic circuit system 100 provided with the locking apparatus 102 according to the invention will be described. Upon actuation of the prime mover 3, the hydraulic pump 2 rotates and the auxiliary pump 30 of the locking apparatus 102 also rotates. Rotation of the auxiliary pump 30 produces a pressure in line 32 by the action of the restrictor 37 in the setting valve 31, so that the pressure in line 32 rises to a level set by the setting valve 31, and the hydraulic pump 2 is sensed as being in a discharge condition. The pressure is led from line 32 through pilot line 36 to the pilot ports of the on-off valves 34 and 35 to switch the valves from the closed position E shown in FIG. 1 to the open position F.

Thereafter, as the control valve 4 is switched to position A by the control lever to drive the inertial mass, the supply line 5 connected to the discharge side of the hydraulic pump 2 is communicated with the first main line 12 through the inlet line 7 and the inlet port a and outlet port b of the control valve 4, and the second main line 13 is communicated with reservoir line 6 through the outlet port c and reservoir port T of the control valve 4, the center bypass line 6a in communication with the supply line 5 to the reservoir 23 being closed by the control valve 4. Thus, the hydraulic fluid in the hydraulic pump 2 is led to the hydraulic motor 1, and the inertial mass is driven by the hydraulic motor. At this time, since the force of inertia produced by the inertial mass acts on the hydraulic motor 1, the speed of the hydraulic motor 1 does not rise quickly, and a high pressure is produced in the first main line 12. When the high pressure in the first main line 12 exceeds the value set by the relief valve 14, the pressure is released into the second main line 13 through relief valve 14 and line 16. Upon completion of acceleration, the hydraulic motor 1 shifts to a steady state condition in which it operates at a constant speed. If the control lever is manipulated to return the control valve 4 to the neutral position N as shown in FIG. 1, then the main lines 12 and 13 are closed by the control valve 4. At this time, the hydraulic motor continues its operation by the forces of inertia of the inertial mass and discharges the fluid drawn from line 12 to line 13, thereby raising the pressure in line 13. When the high pressure exceeds the value set by the relief valve 15, the hydraulic fluid is released to the main line through relief valve 15 and line 17. Thus, the hydraulic motor 1 is gradually decelerated by the high pressure in the main line 13. At this time, as the pressure in the main line 12 tends to become subatmospheric, hydraulic fluid is replenished to the first main line 12 from the reservoir 23 through lines 6, 20 and 21 and the check valve 18.

The foregoing description also applies to the operation of switching the control valve 4 to position B to cause the hydraulic motor 1 to operate in a direction opposite the direction described hereinabove.

When the prime mover 3 is rendered inoperative to interrupt the operation of the hydraulic pump 2 and auxiliary pump 30, the setting valve 31 returns to position C and line 32 is communicated with the reservoir 23 through the restrictor 37 and line 33 to allow the pressure in line 32 to be lowered, thereby sensing that the hydraulic pump 2 is not in a discharge condition. The low pressure in line 32 is transmitted through pilot line 36 to the on-off valves 34 and 35 which are switched to the closed position E shown in FIG. 1. While the on-off valves 34 and 35 are in this position, if the control valve 4 is switched to position A or B, then the hydraulic motor 1 is prevented from operating by the weight of the inertial mass itself or an external force that might be applied to the hydraulic motor 1 because the communication between the control valve 4 and hydraulic motor 1 is blocked by the on-off valves 34 and 35. As is clear from the foregoing, the auxiliary pump 30, pilot pressure setting valve 31, lines 32 and 33, on-off valves 34 and 35, pilot line 36 and restrictor 37 constitute the locking apparatus of the inertial mass drive hydraulic circuit system 100.

From the foregoing, it will be appreciated that the locking apparatus of the inertial mass drive hydraulic circuit system according to the invention operates such that when the actuator means for driving a large inertial mass has the weight of the inertial mass itself or an external force applied thereto, the actuator means is kept from becoming operative if the control valve is switched by mistake in a direction in which the actuator means is driven by the weight of the inertial mass or an external force after the hydraulic pump is rendered inoperative by stopping the prime mover, thereby enabling the danger of the actuator means being operated by mistake to be avoided.

Moreover, in the locking apparatus of the inertial mass drive hydraulic circuit system according to the invention, it is only the on-off valves 34 and 35 that are mounted in the main lines 12 and 13 of the circuit system, and the auxiliary pump 30 may be of a very small size, thereby minimizing a loss of energy. The on-off valves 34 and 35 are normally open during operation of the circuit system, so that the locking device never renders the operation of the circuit system unstable. Additionally, the locking apparatus is composed of simple and small equipment, such as on-off valves, auxiliary pump, pilot pressure setting valve, etc., so that construction is simple and cost is low.

Figure 2:
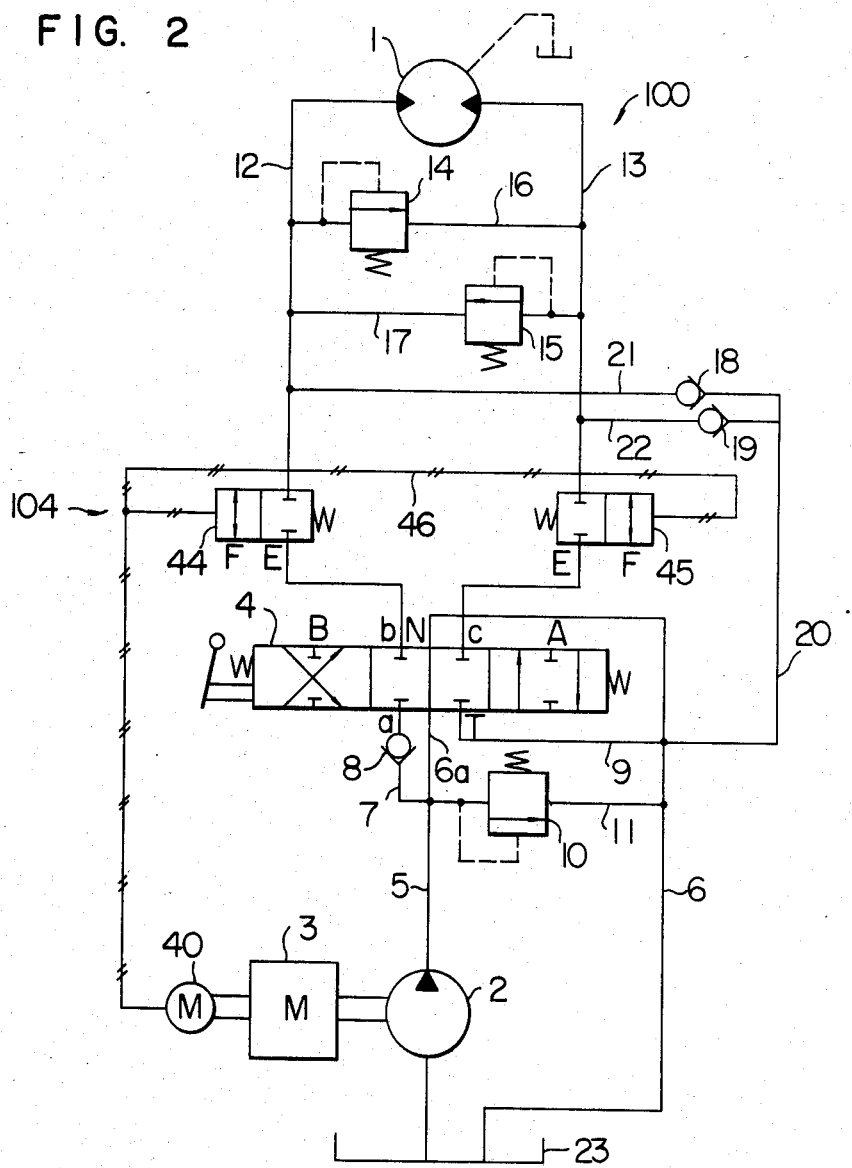
FIG. 2 is a circuit diagram of an inertial mass drive hydraulic circuit system incorporating therein the locking apparatus comprising another embodiment.

As shown in FIG. 2, a locking apparatus generally designated by the reference numeral 104 comprises a generator 40 connected to an output shaft of the prime mover 3 for driving the hydraulic pump 2, and electromagnetic on-off valves 44 and 45 mounted in the main lines 12 and 13, respectively. The generator 40 is connected to coils of the electromagnetic on-off valves 44 and 45 through a cable 46.

When the hydraulic pump 2 is inoperative, the generator 40 is also inoperative, so that the on-off valves 44 and 45 are both in a closed position E. When the hydraulic pump 2 is operative, the generator 40 produces an electric signal to bring the on-off valves 44 and 45 to an open position F.

Figure 3:
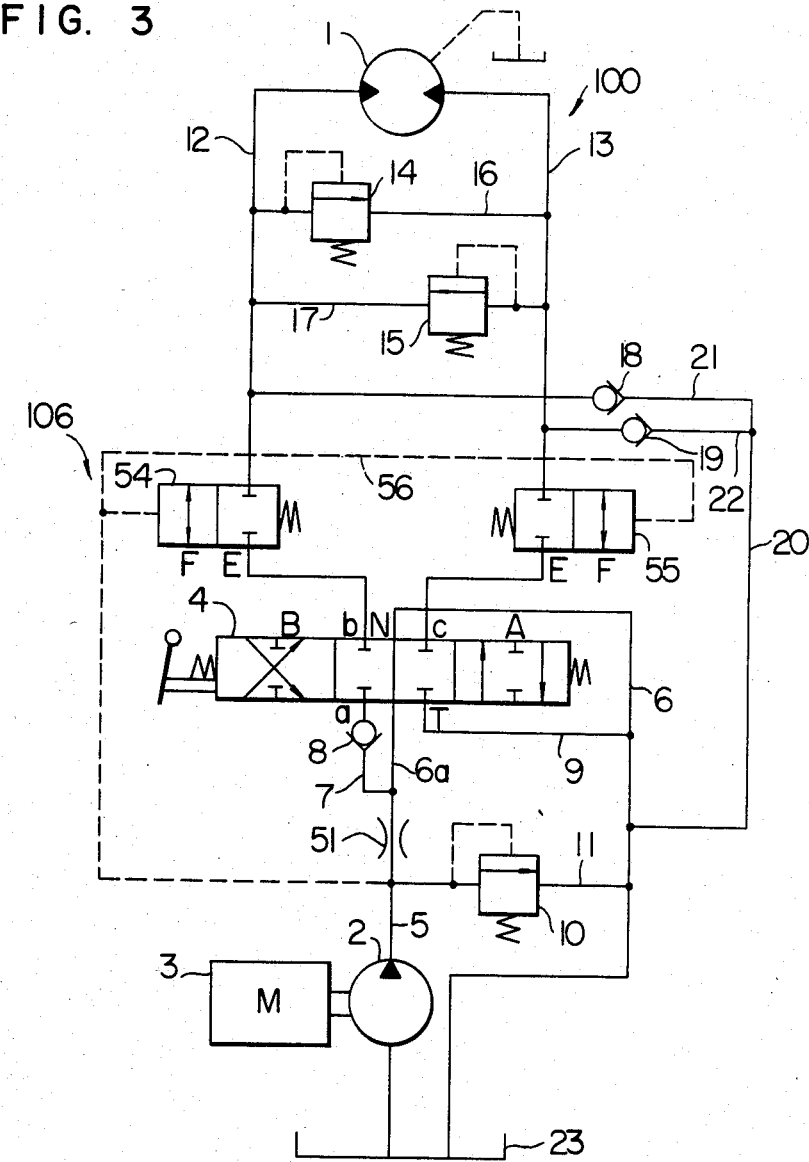
FIG. 3 is a circuit diagram of an inertial mass drive hydraulic circuit system incorporating therein the locking apparatus comprising still another embodiment.

In FIG. 3, locking apparatus generally designated by the reference numeral 106 comprises a restrictor 51 mounted in the supply line 5 connected to the discharge side of the hydraulic pump 2, and pilot operated on-off valves 54 and 55 mounted in the main lines 12 and 13, respectively. A pilot line 56 is connected to the supply line 5 at a location between the restrictor 51 and hydraulic pump 2, and the pilot line 56 is connected to pilot ports of the pilot operated on-off valves 54 and 55. The restrictor 51 can be readily formed by slightly reducing the diameter of the supply line 5 at one part thereof.

When the hydraulic pump 2 is inoperative, the supply line 5 is kept in communication with the reservoir 23 through the control valve and hydraulic pump 2, and therefore the pressure in the supply line 5 and line 56 is made lowered and brings the on-off valves 54 and 55 to the closed position E. Rotation of the hydraulic pump 2 generates a pilot pressure in the portion of the line 5 between the restrictor 51 and hydraulic pump 2 as the hydraulic fluid passes through the restrictor, and the pilot pressure is applied to the pilot ports of the on-off valves 54 and 55 thereby to shift the valves 54 and 55 to an open position F.

Figure 4:
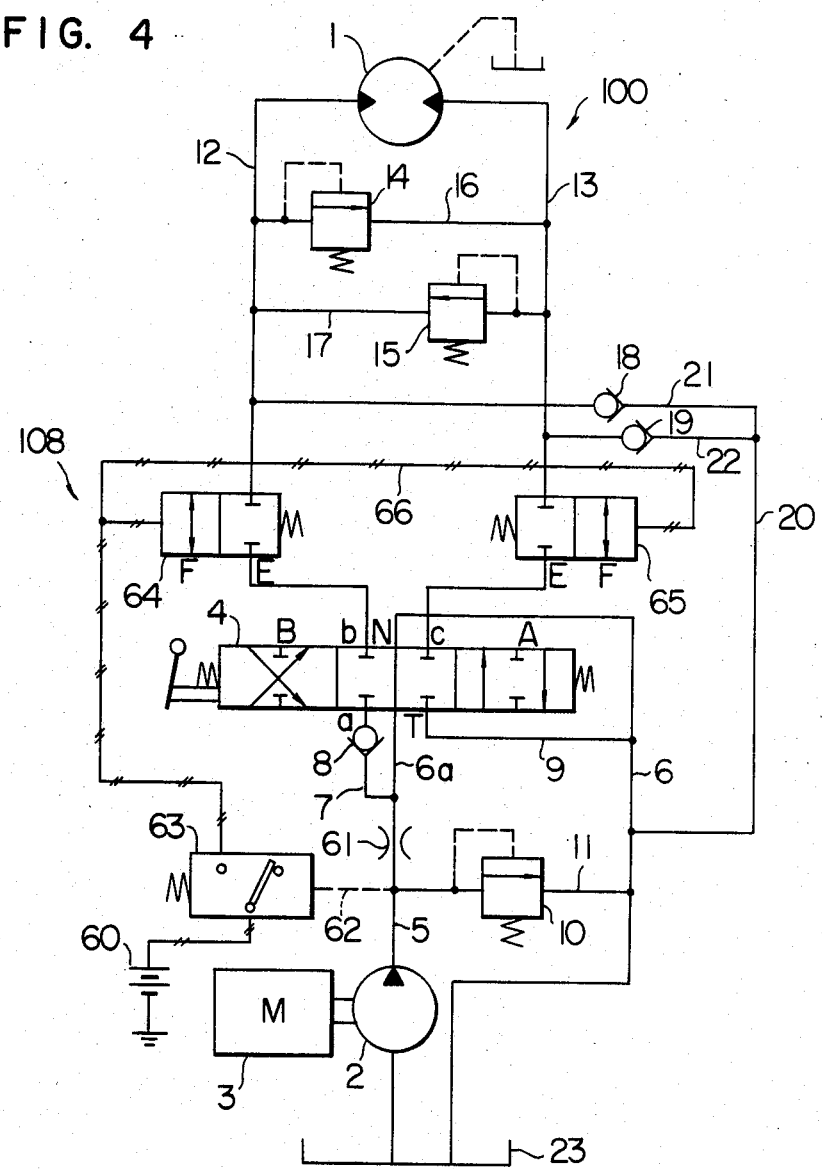
FIG. 4 is a circuit diagram of an inertial mass drive hydraulic circuit system incorporating therein the locking apparatus comprising still another embodiment.

As shown in FIG. 4, a locking apparatus generally designated by the reference numeral 108 comprises a restrictor 61 mounted in the supply line 5 connected to the discharge side of the hydraulic pump 2, a pressure switch 63 responsive to the pressure in a pilot line 62 connected to the supply line 5 at a location between the restrictor 61 and the hydraulic pump 2, and electromagnetic on-off valves 64 and 65 mounted in the main lines 12 and 13, respectively. The pilot line 62 is connected to a pilot port of the pressure switch 63, which is mounted in a cable 66 connecting coils of the electromagnetic on-off valves 64 and 65 to a power source 60.

The pressure switch 63 is turned on when rotation of the hydraulic pump 2 generates a pilot pressure in the portion of the supply line 5 between the restrictor 61 and the hydraulic pump 2, and the coils of the on-off valves 64 and 65 are energized by the power source 60 through the cable 66 thereby to switch the on-off valves 64 and 65 from a closed position E to an open position F.

Figure 5:
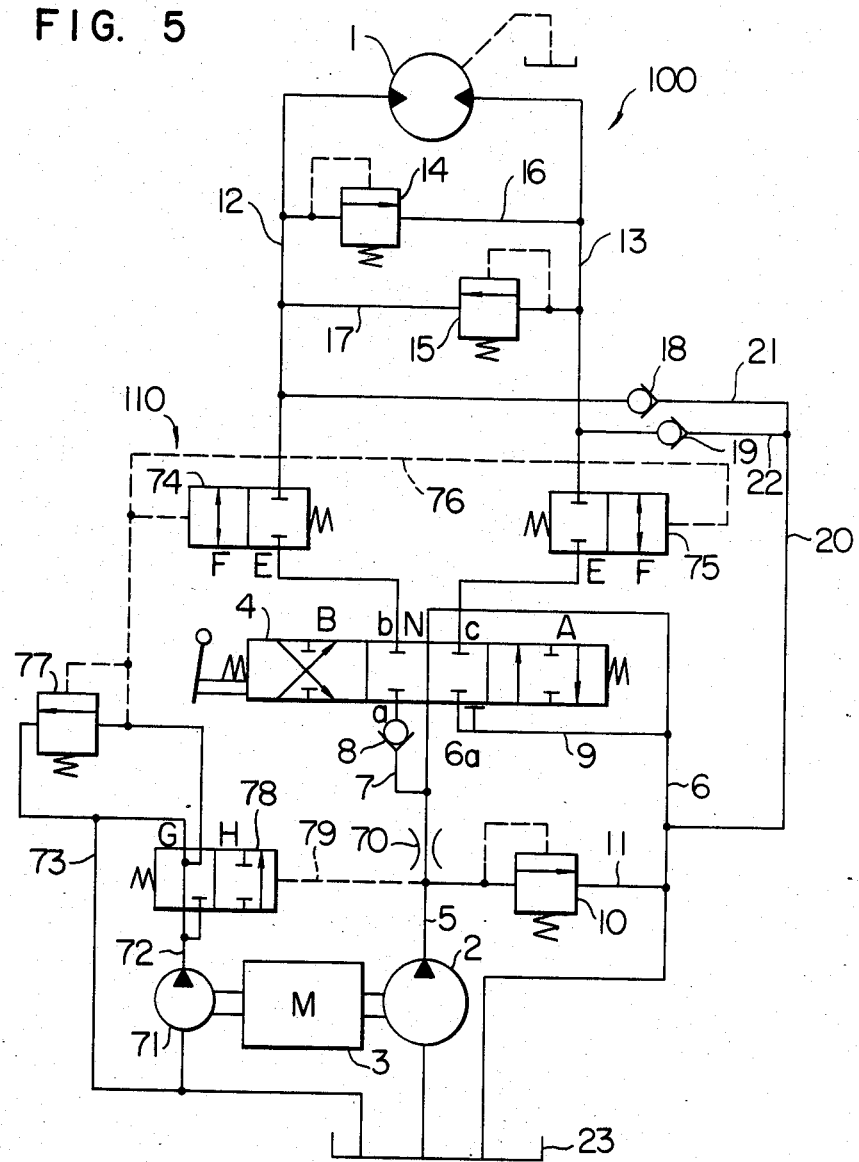
FIG. 5 is a circuit diagram of an inertial mass drive hydraulic circuit system incorporating therein the locking apparatus comprising a further embodiment.

In FIG. 5, locking apparatus generally designated by the reference numeral 110 comprises a restrictor 70 mounted in the supply line 5 connected to the discharge side of the hydraulic pump 2, an auxiliary pump 71 connected to an output shaft of the prime mover 3, a pilot pressure setting valve 77 and a pilot operated directional control valve 78 mounted in a line 72 on the discharge side of the auxiliary pump 71 and electromagnetic on-off valves 74 and 75 mounted in the main lines 12 and 13, respectively. A pilot line 79 is connected to the supply line 5 at a location between the restrictor 70 and the hydraulic pump 2, and the pilot line 79 is communicated with a pilot port of the control valve 78.

When no pressure is generated in the portion of the supply line 5 between the restrictor 70 and the hydraulic pump 2 as the pump 2 is rendered inoperative, the control valve 78 is in a neutral position G in which the line 72 connected to the discharge side of the auxiliary pump 71 and a pilot line 76 connected to pilot ports of the on-off valves 74 and 75 are communicated with a reservoir line 73, and the on-off valves 74 and 75 are in a closed position E. When a pressure is generated in the portion of the supply line 5 between the restrictor 70 and the hydraulic pump 2 as the pump 2 rotates, the control valve 78 is switched to a pilot pressure generating position H to allow the pressure of the hydraulic fluid from the auxiliary pump 71 set by the pilot pressure setting valve 77 to be applied to the pilot ports of the on-off valves 74 and 75 thereby to switch the on-off valves 74 and 75 to an open position F.

Figure 6:
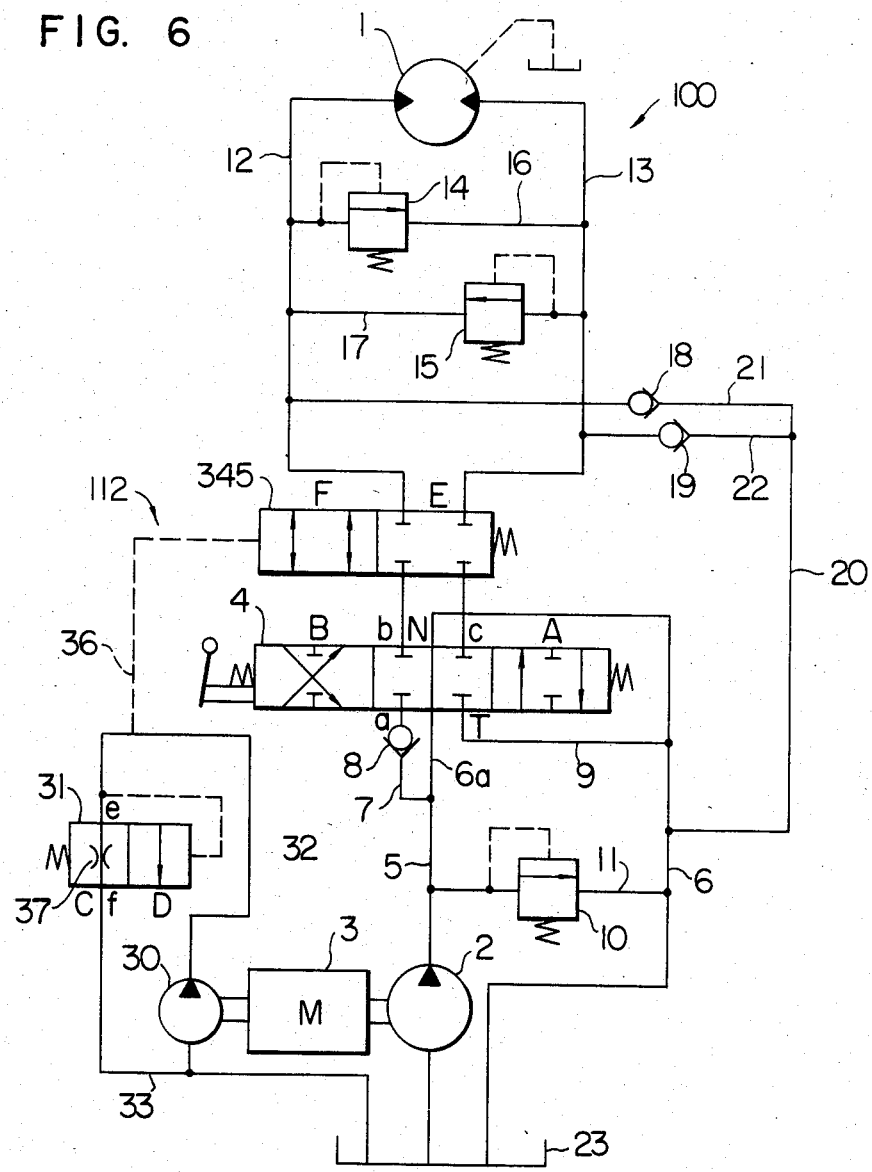
FIG. 6 is a circuit diagram of an inertial mass drive hydraulic circuit system incorporating therein a modification of the locking apparatus shown in FIG. 1.

In the embodiments described hereinabove, the on-off means for the main lines 12 and 13 has been described as comprising separate on-off valves mounted in the respective main lines; however, FIG. 6 shows a modification of the embodiments designated at 112, in which the separate pilot operated on-off valves 34 and 35 shown in FIG. 1 are replaced by a unitary pilot operated on-off valve 345, and other parts are similar to those described in the preceding embodiments.

It will be evident that the embodiments shown in FIGS. 2-6 can achieve the same advantageous effects in operation as the embodiment shown in FIG. 1 In all the embodiments described hereinabove the hydraulic pump 2 has been described as being of a fixed displacement type. However, the invention is not limited to this specific type of hydraulic pump and a variable displacement type hydraulic pump may be used.

In all the embodiments described hereinabove, the hydraulic motor for driving a swing has been described as an example of actuator means for driving a large inertial mass. However, the invention is not limited to this specific type of actuator means, and a hydraulic cylinder for driving a boom, arm or bucket of a hydraulic excavator may be the actuator means for driving a large inertial mass in the invention.

What is claimed is:

1. In a hydraulic excavator comprising an inertial mass drive hydraulic system having a hydraulic pump, actuator means driven by the hydraulic pump for driving a relatively large inertial mass, a directional control valve mounted in main line means connecting the hydraulic pump with the actuator means, and replenishing line means connecting portions of the main line means located between the actuator means and the directional control valve with a reservoir for replenishing the main line means with a hydraulic fluid upon occurrence of a sub-atmospheric pressure in the main line means, the improvement comprising:

an apparatus for locking the inertial mass drive hydraulic system, said apparatus comprising on-off valve means interposed in the main line means between the portions thereof at which the replenishing line means are connected to the main line means and the directional control valve means, the on-off valve means having an open position in which a hydraulic fluid is allowed to freely flow therethrough and thus through the main line means for allowing the actuator means to be driven by the pump in the hydraulic circuit system, and a closed position in which the hydraulic fluid is prevented from flowing therethrough and thus through the main line means for allowing the actuator means to be held in an inoperative position in the hydraulic circuit system, the on-off valve means being normally placed in a closed position; and means for sensing the discharge condition of the hydraulic pump to thereby issue a signal for actuating the on-off valve means for switching from the closed position to the open position upon sensing the hydraulic pump being in a discharge condition, said sensing means including an independent pilot pressure circuit including an auxiliary pump driven with rotation of said hydraulic pump, pilot line means between said auxiliary pump and said on-off valve means, and a pilot-pressure setting valve associated with said pilot line means for establishing a pilot-pressure as said signal for actuating said on-off valve means when said hydraulic pump is caused to rotate with rotation of said hydraulic pump, said pilot line means being separate and independent from the main line means of the inertial mass drive hydraulic system such that said pilot line means is not in fluid communication with said main line means whereby the discharge of the hydraulic pump can be sensed without being influenced by change in pressure in the main line means by the inertial mass drive hydraulic system even if the hydraulic system is subjected to a condition of operation in which the actuator means works as a pump.

2. The hydraulic excavator as claimed in claim 1, where said on-off means comprises on-off valves.

3. The hydraulic excavator as claimed in claim 1, wherein said on-off means comprises a pair of separate on-off valves mounted in respective main lines constituting the line means.

4. The hydraulic excavator as claimed in claim 1, wherein said on-off means comprises a unitary on-off valve mounted in a pair of main lines constituting the line means.

* * * * *